United States Patent
Ding et al.

(10) Patent No.: US 12,348,851 B2
(45) Date of Patent: Jul. 1, 2025

(54) DISPLAY CONTROL DEVICE AND DISPLAY METHOD

(71) Applicant: Komatsu Ltd., Tokyo (JP)

(72) Inventors: Qi Ding, Tokyo (JP); Masanori Minagawa, Tokyo (JP)

(73) Assignee: Komatsu Ltd., Tokyo (JP)

( * ) Notice: Subject to any disclaimer, the term of this patent is extended or adjusted under 35 U.S.C. 154(b) by 178 days.

(21) Appl. No.: 18/019,878

(22) PCT Filed: Aug. 30, 2021

(86) PCT No.: PCT/JP2021/031727
§ 371 (c)(1),
(2) Date: Feb. 6, 2023

(87) PCT Pub. No.: WO2022/070720
PCT Pub. Date: Apr. 7, 2022

(65) Prior Publication Data
US 2023/0291989 A1    Sep. 14, 2023

(30) Foreign Application Priority Data

Sep. 29, 2020    (JP) .................................. 2020-162923

(51) Int. Cl.
*H04N 23/57*    (2023.01)
*G06T 7/00*    (2017.01)
(Continued)

(52) U.S. Cl.
CPC ........... *H04N 23/57* (2023.01); *G06T 7/0004* (2013.01); *G06T 7/70* (2017.01); *H04N 23/632* (2023.01);
(Continued)

(58) Field of Classification Search
CPC .... H04N 23/57; H04N 23/632; H04N 23/633; H04N 7/183; G06T 7/0004; G06T 7/70;
(Continued)

(56) References Cited

U.S. PATENT DOCUMENTS 11,427,988 B2 *    8/2022    Takahama ............ H04N 13/122
11,772,556 B2 *    10/2023    Ding ........................ B60R 1/23
348/148

(Continued)

FOREIGN PATENT DOCUMENTS

EP    3934241 A1    1/2022
JP    2008-121280 A    5/2008
(Continued)

*Primary Examiner* — Brian P Sweeney
(74) *Attorney, Agent, or Firm* — Fish & Richardson P.C.

(57) ABSTRACT

A captured image acquisition unit acquires a captured image showing work equipment from a camera provided at a work machine. A blade edge shadow generation unit generates a blade edge shadow obtained by projecting a blade edge of the work equipment on a projection surface toward a vertical direction. A display image generation unit generates a display image obtained by superimposing the captured image, the blade edge shadow, a left line, and a right line. The left line passes through a left end of the blade edge shadow and extends in a front-and-rear direction of the work equipment along the projection surface. The right line passes through a right end of the blade edge shadow and extends in the front-and-rear direction of the work equipment along the projection surface. A display control unit outputs a display signal for displaying the display image.

9 Claims, 13 Drawing Sheets

(51) Int. Cl.
   *G06T 7/70*       (2017.01)
   *H04N 23/63*      (2023.01)
(52) U.S. Cl.
   CPC .  *H04N 23/633* (2023.01); *G06T 2207/20221* (2013.01); *G06T 2207/30164* (2013.01)
(58) Field of Classification Search
   CPC . G06T 2207/20221; G06T 2207/30164; G06T 2219/012; G06T 15/60; G06T 19/006; E02F 9/262; E02F 9/205
   See application file for complete search history.

(56) References Cited

U.S. PATENT DOCUMENTS

| | | | |
|---|---|---|---|
| 11,939,747 B2 * | 3/2024 | Itoh | E02F 9/261 |
| 2014/0099178 A1 | 4/2014 | Nomura et al. | |
| 2018/0051446 A1 | 2/2018 | Yoshinada et al. | |
| 2019/0330825 A1 | 10/2019 | Tanimoto et al. | |
| 2021/0238828 A1 | 8/2021 | Takahama et al. | |
| 2021/0250561 A1 | 8/2021 | Takahama et al. | |
| 2021/0291733 A1 | 9/2021 | Ding et al. | |

FOREIGN PATENT DOCUMENTS

| | | |
|---|---|---|
| JP | 2013-113044 A | 6/2013 |
| JP | 2014-074318 A | 4/2014 |
| JP | 2016-102312 A | 6/2016 |
| JP | 2016-160741 A | 9/2016 |
| JP | 2018035645 A1 | 3/2018 |
| WO | 2020003631 A1 | 1/2020 |
| WO | 2020003632 A1 | 1/2020 |
| WO | 2020090985 A1 | 5/2020 |
| WO | 2020175645 A1 | 9/2020 |

* cited by examiner

DISPLAY CONTROL DEVICE AND DISPLAY METHOD

CROSS-REFERENCE TO RELATED APPLICATIONS

This application is a National Stage application under 35 U.S.C. § 371 of International Application No. PCT/JP2021/031727, filed on Aug. 30, 2021, which claims priority to Japanese Patent Application No. 2020-162923, filed on Sep. 29, 2020. The contents of the prior applications are incorporated herein in their entirety.

TECHNICAL FIELD

The present disclosure relates to a display control device and a display method.

BACKGROUND ART

A technique of remotely operating a work machine is known. The remotely operated work machine is provided with a camera, and an image of a work site in operation is captured. The captured image is transmitted to a remote location and is displayed on a display device disposed in the remote location. An operator of the remote location remotely operates the work machine while viewing the captured image displayed on the display device. Since the captured image displayed on the display device is two-dimensional, it is difficult to give the operator a sense of perspective.

A technique of displaying a mesh-shaped line image on a surface of a work target shown in a captured image since the operator is given with a sense of perspective is disclosed in Patent Document 1.

CITATION LIST

Patent Document

Patent Document 1
Japanese Unexamined Patent Application, First Publication No. 2018-035645

SUMMARY OF INVENTION

Technical Problem

In a case of operating the work machine while viewing the two-dimensional captured image, it is difficult for the operator to recognize a region of a work target where work by work equipment is possible. For this reason, there is a possibility of decreasing work efficiency of the operator.

An object of the present disclosure is to provide a display control device and a display method that can prevent a decrease in work efficiency when work is performed using a work machine.

Solution to Problem

According to an aspect of the present invention, there is provided a display control device that displays an image used in order to operate a work machine including work equipment, the display control device including: a captured image acquisition unit configured to acquire a captured image showing the work equipment from a camera provided at the work machine; a blade edge shadow generation unit configured to generate a blade edge shadow obtained by projecting a blade edge of the work equipment on a projection surface toward a vertical direction; a display image generation unit configured to generate a display image obtained by superimposing the captured image, the blade edge shadow, a left line which passes through a left end of the blade edge shadow and which extends in a front-and-rear direction of the work equipment along the projection surface, and a right line which passes through a right end of the blade edge shadow and which extends in the front-and-rear direction of the work equipment along the projection surface; and a display control unit configured to output a display signal for displaying the display image.

Advantageous Effects of Invention

According to the above aspect of the present invention, a decrease in the work efficiency when work is performed using the work machine can be prevented.

DESCRIPTION OF EMBODIMENTS

First Embodiment

<<Work System 1>>

Figure 1:
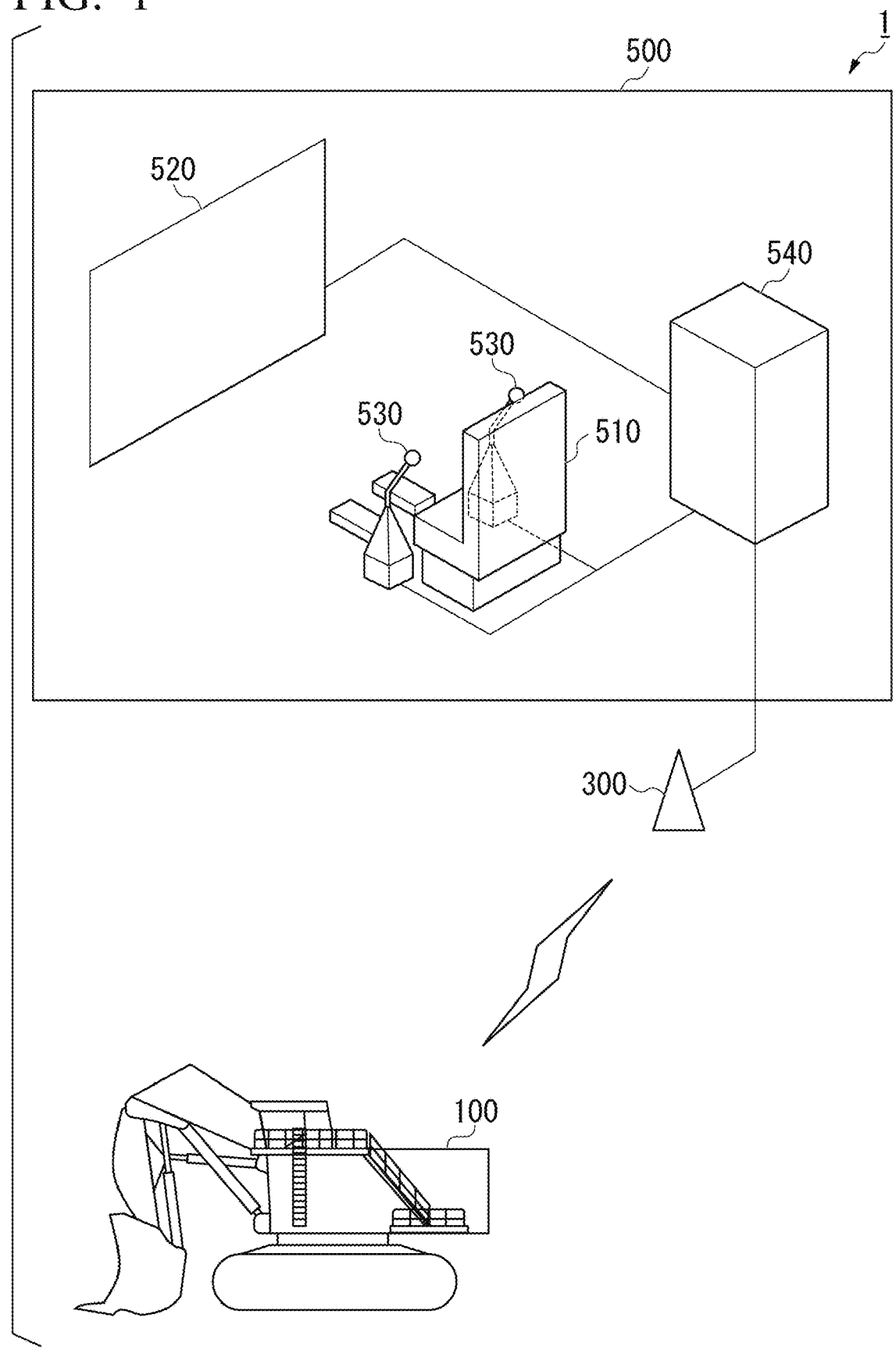
FIG. 1 is a schematic view showing the configuration of a work system according to a first embodiment.

FIG. 1 is a schematic view showing the configuration of a work system 1 according to a first embodiment.

The work system 1 includes a work machine 100 and a remote operation room 500. The work machine 100 operates at a work site. Exemplary examples of the work site include mines and quarries. The remote operation room 500 is provided at a remote location separated away from the work site. Exemplary examples of the remote location include cities and locations in the work site. That is, an operator remotely operates the work machine 100 from a distance where the work machine 100 cannot be visually recognized.

The work machine 100 is remotely operated based on an operation signal transmitted from the remote operation room 500. The remote operation room 500 is connected to the work machine 100 via an access point 300 provided at the work site. The operation signal indicating an operation by the operator, which is received from the remote operation room 500, is transmitted to the work machine 100 via the access point 300. The work machine 100 operates based on the operation signal received from the remote operation room 500. That is, the work system 1 includes a remote operation system configured by the work machine 100 and the remote operation room 500. In addition, the work machine 100 captures an image of a work target, and the image is displayed in the remote operation room 500. That is, the work system 1 is an example of a display control system.

<<Work Machine 100>>

Figure 2:
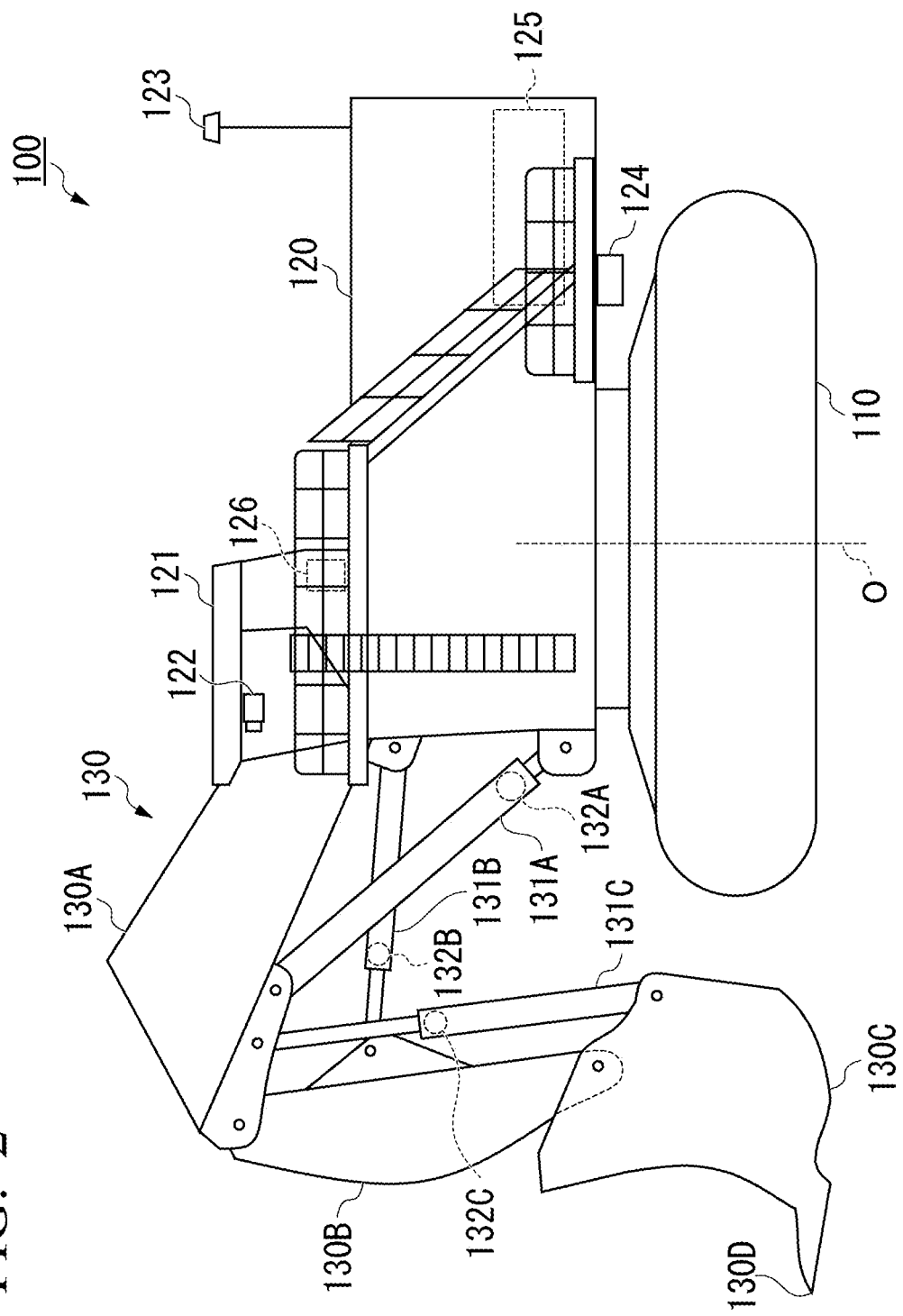
FIG. 2 is an external view of a work machine according to the first embodiment.

FIG. 2 is an external view of the work machine 100 according to the first embodiment.

The work machine 100 according to the first embodiment is a loading excavator (face excavator). The work machine 100 according to another embodiment may be another work machine such as a backhoe, a wheel loader, and a bulldozer.

The work machine 100 includes a carriage 110, a swing body 120 that is supported by the carriage 110, and work equipment 130 that is operated by a hydraulic pressure and is supported by the swing body 120. The swing body 120 is supported to be swingable around a swinging central axis O. The work equipment 130 is provided at a front portion of the swing body 120.

The work equipment 130 includes a boom 130A, an arm 130B, and a bucket 130C.

A base end portion of the boom 130A is attached to the swing body 120 via a pin.

The arm 130B connects the boom 130A to the bucket 130C. A base end portion of the arm 130B is attached to a tip portion of the boom 130A via a pin.

The bucket 130C includes a blade edge 130D for excavating earth and a container for accommodating the excavated earth. A base end portion of the bucket 130C is attached to a tip portion of the arm 130B via a pin.

The work equipment 130 is driven by movements of a boom cylinder 131A, an arm cylinder 131B, and a bucket cylinder 131C. Hereinafter, the boom cylinder 131A, the arm cylinder 131B, and the bucket cylinder 131C will also be collectively referred to as a hydraulic cylinder 131.

The boom cylinder 131A is a hydraulic cylinder for operating the boom 130A. A base end portion of the boom cylinder 131A is attached to the swing body 120. A tip portion of the boom cylinder 131A is attached to the boom 130A.

The arm cylinder 131B is a hydraulic cylinder for driving the arm 130B. A base end portion of the arm cylinder 131B is attached to the boom 130A. A tip portion of the arm cylinder 131B is attached to the arm 130B.

The bucket cylinder 131C is a hydraulic cylinder for driving the bucket 130C. A base end portion of the bucket cylinder 131C is attached to the boom 130A. A tip portion of the bucket cylinder 131C is attached to the bucket 130C.

A boom posture sensor 132A, an arm posture sensor 132B, and a bucket posture sensor 132C that detect postures of the boom 130A, the arm 130B, and the bucket 130C are attached to the work equipment 130. Hereinafter, the boom posture sensor 132A, the arm posture sensor 132B, and the bucket posture sensor 132C will also be collectively referred to as a posture sensor 132. The posture sensor 132 according to the first embodiment is a stroke sensor attached to the hydraulic cylinder 131. That is, the posture sensor 132 detects a stroke length of the hydraulic cylinder 131. The term "stroke length" is a moving distance of a rod from a stroke end of the hydraulic cylinder 131. The term "stroke end" refers to an end portion in a movable range of the rod. That is, the term "stroke end" refers to the position of the rod in a state where the hydraulic cylinder 131 has most contracted or the position of the rod in a state where the hydraulic cylinder 131 has most extended.

The boom posture sensor 132A is provided at the boom cylinder 131A and detects the stroke length of the boom cylinder 131A.

The arm posture sensor 132B is provided at the arm cylinder 131B and detects the stroke length of the arm cylinder 131B.

The bucket posture sensor 132C is provided at the bucket cylinder 131C and detects the stroke length of the bucket cylinder 131C.

The posture sensor 132 according to another embodiment is not limited thereto. For example, in another embodiment, the posture sensor 132 may detect a relative rotation angle with potentiometers provided at the base end portions of the boom 130A, the arm 130B, and the bucket 130C, may detect a rotation angle with respect to a vertical direction with an IMU, or may detect a rotation angle with respect to the vertical direction with an inclinometer.

The swing body 120 includes a cab 121. The cab 121 is provided with a camera 122. The camera 122 is provided in an upper front portion in the cab 121. The camera 122 captures an image of the front of the cab 121 through a windshield in a front portion of the cab 121. Herein, the term "front" refers to a direction in which the work equipment 130 is mounted on the swing body 120, and the term "rear" refers to a direction opposite to the "front". The term "side" refers to a direction (right-and-left direction) intersecting a front-and-rear direction. An exemplary example of the camera 122 includes an imaging device using a charge coupled device (CCD) sensor and a complementary metal oxide semiconductor (CMOS) sensor. In another embodiment, the camera 122 may not necessarily have to be provided in the cab 121, and it is sufficient that the camera is provided at a position where at least a construction target and the work equipment 130 can be imaged. That is, an imaging range of the camera 122 includes at least a part of the work equipment 130.

The work machine 100 includes the camera 122, a position and azimuth direction calculator 123, an inclination measurer 124, a hydraulic device 125, and a vehicle control device 126.

The position and azimuth direction calculator 123 calculates a position of the swing body 120 and an azimuth direction in which the swing body 120 faces. The position and azimuth direction calculator 123 includes two receivers that receive positioning signals from an artificial satellite configuring GNSS. The two receivers are provided at positions different from each other on the swing body 120. The position and azimuth direction calculator 123 detects a position of a representative point of the swing body 120 in a site coordinate system (the origin of a vehicle body coordinate system) based on the positioning signals received by the receivers. The position and azimuth direction calculator 123 uses each of the positioning signals received by the two receivers to calculate an azimuth direction in which the swing body 120 faces as a relationship between a provision position of one receiver and a provision position of the other receiver. In another embodiment, the position and azimuth direction calculator 123 may detect an azimuth direction in which the swing body 120 faces based on a measurement value of a rotary encoder or an IMU.

The inclination measurer 124 measures the acceleration and angular speed of the swing body 120 and detects the posture (for example, a roll angle and a pitch angle) of the swing body 120 based on the measurement result. The inclination measurer 124 is provided, for example, on a lower surface of the swing body 120. The inclination measurer 124 can use, for example, an inertial measurement unit (IMU).

The hydraulic device 125 supplies a hydraulic oil to the hydraulic cylinder 131. The flow rate of the hydraulic oil supplied to the hydraulic cylinder 131 is controlled based on a control command received from the vehicle control device 126.

The vehicle control device 126 transmits, to the remote operation room 500, an image captured by the camera 122, the swinging speed, position, azimuth direction, and inclination angle of the swing body 120, the posture of the work equipment 130, and the traveling speed of the carriage 110. In addition, the vehicle control device 126 receives an operation signal from the remote operation room 500 and drives the work equipment 130, the swing body 120, and the carriage 110 based on the received operation signal.

<<Remote Operation Room 500>>

The remote operation room 500 includes a driver's seat 510, a display device 520, an operation device 530, and a remote control device 540.

The display device 520 is disposed in front of the driver's seat 510. The display device 520 is disposed in front of the operator eyes when the operator sits on the driver's seat 510. The display device 520 may be configured by a plurality of arranged displays or may be configured by one large display as shown in FIG. 1. In addition, the display device 520 may project an image on a curved surface or a spherical surface with a projector.

The operation device 530 is an operation device for the remote operation system. The operation device 530 generates, in response to an operation by the operator, an operation signal of the boom cylinder 131A, an operation signal of the arm cylinder 131B, an operation signal of the bucket cylinder 131C, a right-and-left swing operation signal of the swing body 120, and a travel operation signal of the carriage 110 for moving forward and backward and outputs the signals to the remote control device 540. The operation device 530 is configured by, for example, a lever, a knob switch, and a pedal (not shown).

The operation device 530 is disposed in the vicinity of the driver's seat 510. The operation device 530 is positioned within a range where the operator can operate when the operator sits on the driver's seat 510.

The remote control device 540 generates a display image based on data received from the work machine 100 and displays the display image on the display device 520. In addition, the remote control device 540 transmits an operation signal indicating the operation of the operation device 530 to the work machine 100. The remote control device 540 is an example of a display control device.

Figure 3:
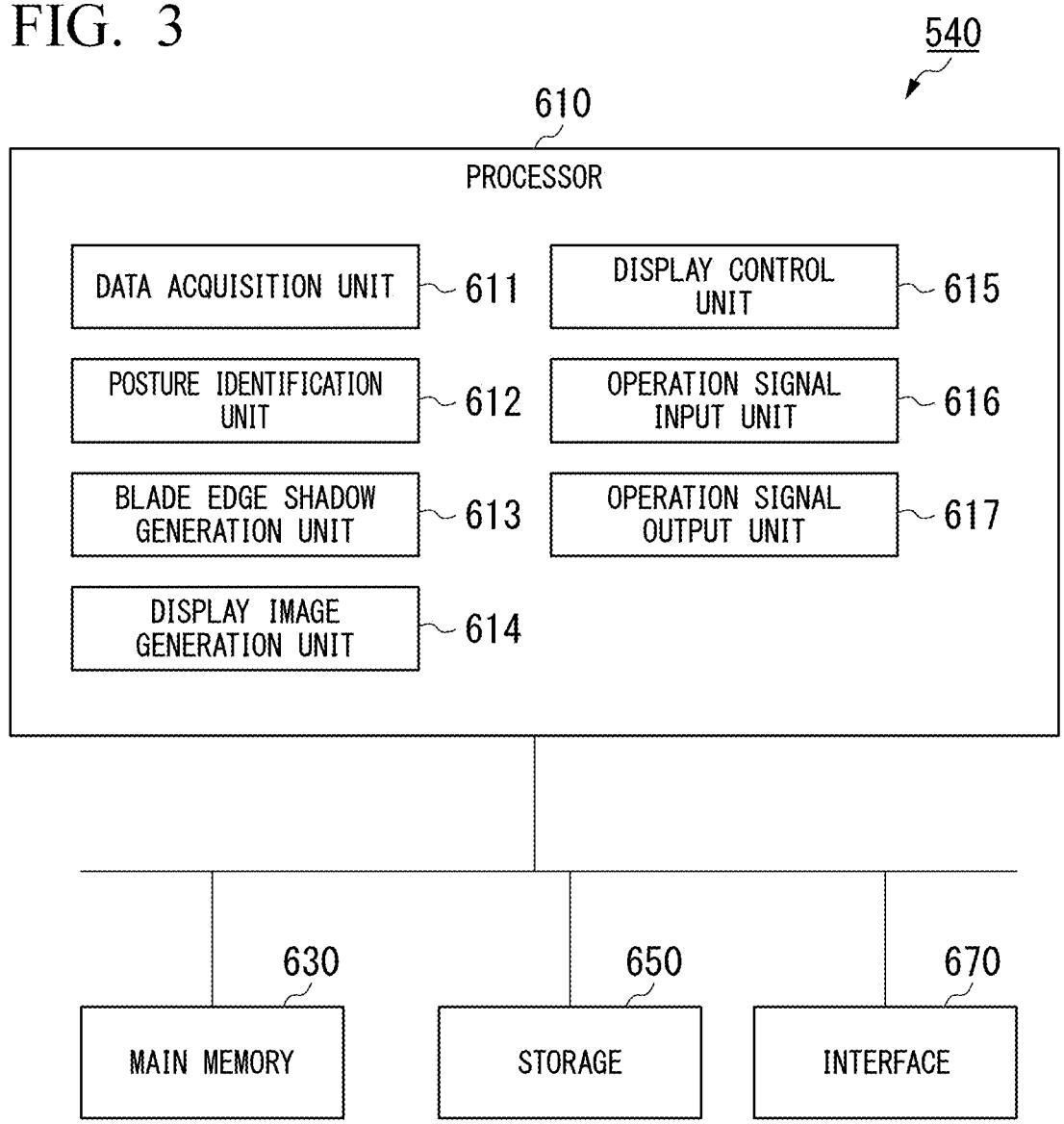
FIG. 3 is a schematic block diagram showing the configuration of a remote control device according to the first embodiment.

FIG. 3 is a schematic block diagram showing the configuration of the remote control device 540 according to the first embodiment.

The remote control device 540 is a computer including a processor 610, a main memory 630, a storage 650, and an interface 670. The storage 650 stores a program. The processor 610 reads the program from the storage 650 to load the program in the main memory 630 and executes processing in accordance with the program. The remote control device 540 is connected to a network via the interface 670.

Exemplary examples of the storage 650 include a magnetic disk, an optical disk, a magneto-optical disk, and a semiconductor memory. The storage 650 may be an internal medium directly connected to a common communication line of the remote control device 540 or may be an external medium connected to the remote control device 540 via the interface 670. The storage 650 is a non-transitory tangible storage medium.

By executing the program, the processor 610 includes a data acquisition unit 611, a posture identification unit 612, a blade edge shadow generation unit 613, a display image generation unit 614, a display control unit 615, an operation signal input unit 616, and an operation signal output unit 617.

In another embodiment, in addition to the configuration or instead of the configuration, the remote control device 540 may include a custom large scale integrated circuit (LSI) such as a programmable logic device (PLD). Exemplary examples of the PLD include Programmable Array Logic (PAL), Generic Array Logic (GAL), a complex programmable logic device (CPLD), and field programmable gate array (FPGA). In this case, some or all of functions realized by the processor 610 may be realized by the integrated circuit. Such an integrated circuit is also included as an example of the processor.

The data acquisition unit 611 acquires, from the work machine 100, data indicating an image captured by the camera 122, the swinging speed, position, azimuth direction, and inclination angle of the swing body 120, the posture of the work equipment 130, and the traveling speed of the carriage 110.

The posture identification unit 612 identifies the posture of the work machine 100 in the vehicle body coordinate system and the posture thereof in the site coordinate system based on the data acquired by the data acquisition unit 611. The term "vehicle body coordinate system" is a local coordinate system defined by three axes, including the front-rear axis, right-left axis, and up-down axis of the swing body 120, with an intersection of the swinging central axis O of the swing body 120 and a bottom surface of the carriage 110 as the origin. The term "site coordinate system" is a global coordinate system defined by three axes, including a latitude axis, a longitude axis, and a vertical axis, with a predetermined point (such as a reference station) on the work site as the origin. The posture identification unit 612 identifies positions in the vehicle body coordinate system and positions in the site coordinate system for a tip of the boom 130A, a tip of the arm 130B, and both right and left ends of the blade edge 130D. A specific method of identifying a position of each portion by the data acquisition unit 611 will be described later.

The blade edge shadow generation unit 613 generates a blade edge shadow image showing a blade edge shadow obtained by projecting the blade edge 130D on a projection surface toward the vertical direction based on the positions of both ends of the blade edge 130D in the site coordinate system which are identified by the posture identification unit 612. The projection surface according to the first embodiment is a plane surface passing through the bottom surface of the carriage 110. Specifically, the blade edge shadow generation unit 613 generates a blade edge shadow image through the following procedures. The blade edge shadow generation unit 613 identifies the position of the blade edge shadow projected on the projection surface in the site coordinate system by rewriting values of up-down axis components of the positions of both ends of the blade edge 130D to zero. Based on known camera parameters indicating a relationship between an image coordinate system, which is a two-dimensional orthogonal coordinate system related to an image captured by the camera 122, and the site coordinate system, the blade edge shadow generation unit 613 converts the position of the blade edge shadow in the site coordinate system into a position in the image coordinate system. The blade edge shadow generation unit 613 generates a blade edge shadow image by drawing a line segment representing the blade edge 130D at the converted position.

Figure 4:
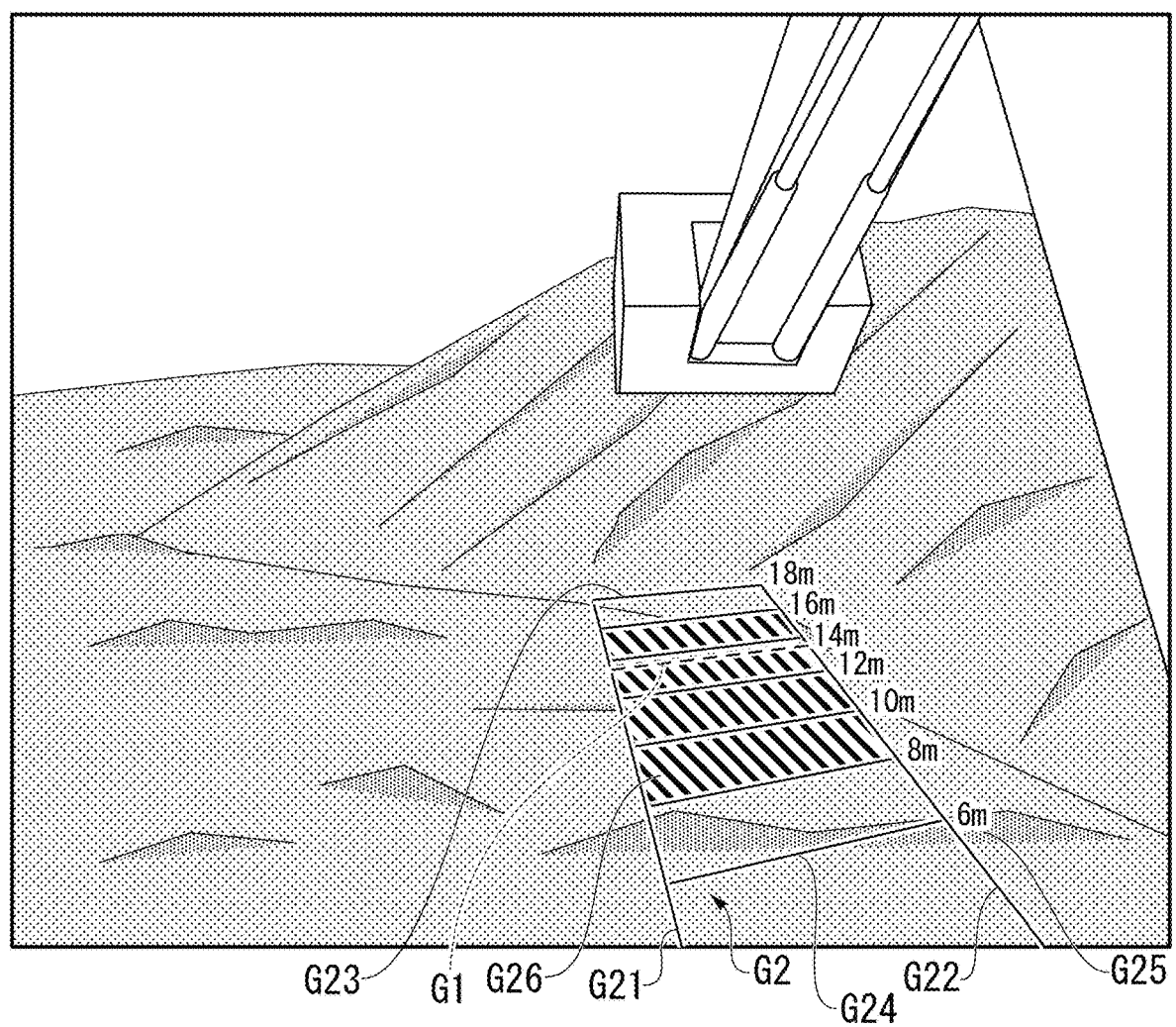
FIG. 4 is a view showing an example of a display image according to the first embodiment.

The display image generation unit 614 generates a display image by superimposing a blade edge shadow image G1 and a blade edge reach gauge image G2 on a captured image acquired by the data acquisition unit 611. FIG. 4 is a view showing an example of the display image according to the first embodiment. The blade edge reach gauge image G2 includes a left line G21, a right line G22, a maximum reach line G23, scale lines G24, scale values G25, and a reference range graphic G26.

The left line G21 is a line indicating the reachable range of a left end of the blade edge 130D. As shown in FIG. 4, the left line G21 passes through a left end of the blade edge shadow image G1.

The right line G22 is a line indicating the reachable range of a right end of the blade edge 130D. As shown in FIG. 4, the right line G22 passes through a right end of the blade edge shadow image G1.

The maximum reach line G23 is a line indicating a front edge of the reachable range of the blade edge 130D. The maximum reach line G23 connects a front end of the left line G21 to a front end of the right line G22. The scale lines G24 are lines representing distances from the swinging central axis O of the swing body 120.

The scale lines G24 are provided at regular intervals. In the example of FIG. 4, the scale lines G24 are provided at intervals of two meters. Each of the scale lines G24 is provided to connect the left line G21 to the right line G22. The maximum reach line G23 and the scale lines G24 are lines parallel to the blade edge shadow image G1.

The scale values G25 are provided to correspond to the scale lines G24 and represent distances indicated by the scale lines G24 in numerical values. In the example shown in FIG. 4, the scale values G25 are provided in the vicinity of right ends of the scale lines G24.

The reference range graphic G26 is a graphic showing the reachable range of the blade edge 130D on the projection surface. The reference range graphic G26 according to the first embodiment is a quadrangle surrounded by the left line G21, the right line G22, the front edge of the reachable range on the projection surface, and a rear edge of the reachable range on the projection surface. The reachable range of the blade edge 130D on the projection surface is the reachable range of the blade edge 130D under a condition in which the projection surface and the blade edge 130D come into contact with each other. The reference range graphic G26 is highlighted and displayed with hatching or coloring.

The maximum reach line G23 and the front ends of the left line G21 and the right line G22 represent the front edge of the reachable range of the blade edge 130D when the condition in which the projection surface and the blade edge 130D come into contact with each other is not imposed. The maximum reach line G23, the left line G21, and the right line G22 are examples of a reachable range graphic obtained by projecting the reachable range of the blade edge when the condition is not imposed.

Figure 5:
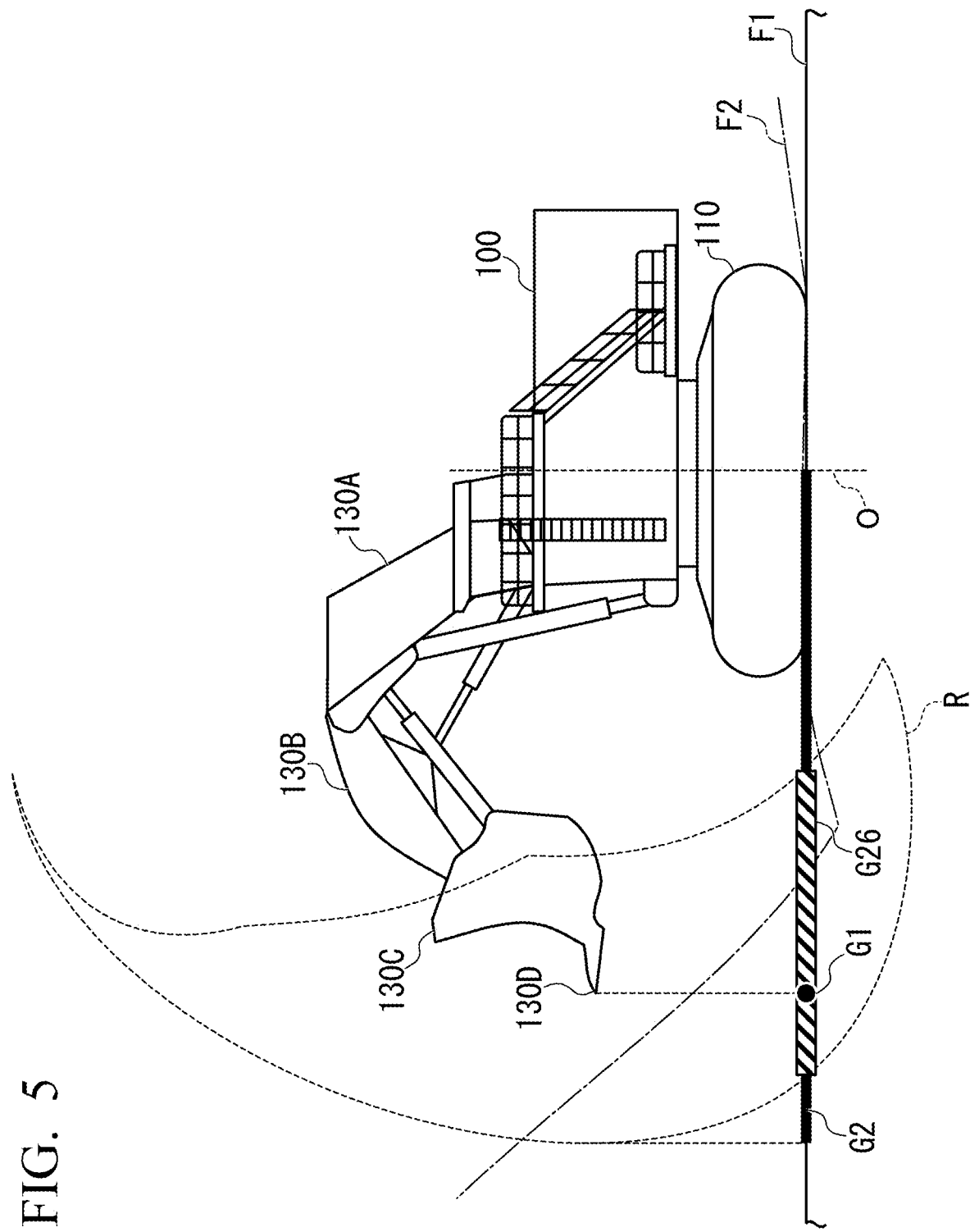
FIG. 5 is a side view showing a relationship between a blade edge shadow image and a blade edge reach gauge image according to the first embodiment.

FIG. 5 is a side view showing a relationship between the blade edge shadow image G1 and the blade edge reach gauge image G2 according to the first embodiment. The blade edge shadow image G1 and the blade edge reach gauge image G2 according to the first embodiment are drawn on a projection surface F1 which is a plane surface passing through the bottom surface of the carriage 110. For this reason, when the blade edge shadow image G1 and the blade edge reach gauge image G2 are superimposed on a captured image, in a portion of a ground surface F2 higher than the projection surface F1, the blade edge shadow image G1 and the blade edge reach gauge image G2 are shown to be sunk with respect to the ground surface F2. In a portion of the ground surface F2 lower than the projection surface F1, the blade edge shadow image G1 and the blade edge reach gauge image G2 are shown to be floating with respect to the ground surface F2.

As shown in FIG. 5, the front edge of the blade edge reach gauge image G2, that is, the maximum reach line G23 is shown at a position where a position most separated away from the swinging central axis O in a reachable range R of the blade edge 130D is projected on the projection surface F1. For this reason, the blade edge shadow image G1 is positioned in front of the maximum reach line G23 at all times even when the blade edge 130D is in any posture.

As shown in FIG. 5, the reference range graphic G26 indicates a range where the reachable range of the blade edge 130D and the projection surface overlap each other.

Since the camera 122 is fixed to the swing body 120, the reachable range of the blade edge 130D on the projection surface in the image coordinate system does not change regardless of the swinging of the swing body 120 and the traveling of the carriage 110. That is, the blade edge reach gauge image G2 is constant regardless of the position and posture of the work machine 100. Therefore, the display image generation unit 614 according to the first embodiment generates a display image by superimposing the blade edge reach gauge image G2 prepared in advance on the captured image.

The display control unit 615 outputs a display signal for displaying the display image generated by the display image generation unit 614 to the display device 520.

The operation signal input unit 616 receives an operation signal from the operation device 530.

The operation signal output unit 617 transmits the operation signal received by the operation signal input unit 616 to the work machine 100.

<<Method of Identifying Posture>>

Herein, a method of identifying a posture with the posture identification unit 612 will be described. The posture identification unit 612 identifies, through the following procedures, positions in the vehicle body coordinate system and positions in the site coordinate system for the tip of the boom 130A (the pin of the tip portion), the tip of the arm 130B (the pin of the tip portion), and both ends of the blade edge 130D.

The posture identification unit 612 identifies an angle of the boom 130A with respect to the swing body 120, that is, an angle with respect to the front-rear axis of the vehicle body coordinate system based on the stroke length of the boom cylinder 131A. The posture identification unit 612 identifies a boom vector extending from a base end (the pin of the base end portion) of the boom 130A to the tip (the pin of the tip portion) of the boom 130A in the vehicle body coordinate system based on the angle of the boom 130A and the known length of the boom 130A. The posture identification unit 612 identifies a position vector of the tip (the pin of the tip portion) of the boom 130A in the vehicle body coordinate system by adding the known position vector and boom vector of the base end (the pin of the base end portion) of the boom 130A in the vehicle body coordinate system.

The posture identification unit 612 identifies the angle of the arm 130B with respect to the boom 130A based on the stroke length of the arm cylinder 131B. The posture identification unit 612 identifies the angle of the arm 130B with respect to the front-rear axis by adding the identified angle of the arm 130B and the angle of the boom 130A with respect to the front-rear axis in the vehicle body coordinate system. The posture identification unit 612 identifies an arm vector extending from a base end (the pin of the base end portion) of the arm 130B to the tip (the pin of the tip portion) of the arm 130B in the vehicle body coordinate system based on the angle of the arm 130B and the known length of the arm 130B. The posture identification unit 612 identifies a position vector of the tip (the pin of the tip portion) of the arm 130B in the vehicle body coordinate system by adding the position vector and arm vector of the tip (the pin of the tip portion) of the boom 130A in the vehicle body coordinate system.

The posture identification unit 612 identifies the angle of the bucket 130C with respect to the arm 130B based on the stroke length of the bucket cylinder 131C. The posture identification unit 612 identifies the angle of the bucket 130C with respect to the front-rear axis by adding the identified angle of the bucket 130C and the angle of the arm 130B with respect to the front-rear axis in the vehicle body coordinate system. The posture identification unit 612 identifies a right bucket vector and a left bucket vector based on the angle of the bucket 130C, the known length from the base end (the pin of the base end portion) of the bucket 130C to the blade edge 130D, and the known width of the blade edge 130D. The right bucket vector is a vector extending from the base end (the pin of the base end portion) of the bucket 130C to the right end of the blade edge 130D in the vehicle body coordinate system. The left bucket vector is a vector extending from the base end of the bucket 130C to the left end of the blade edge 130D. The posture identification unit 612 identifies a position vector of the left end of the blade edge 130D in the vehicle body coordinate system by adding the position vector and left bucket vector of the tip (the pin of the tip portion) of the arm 130B in the vehicle body coordinate system. In addition, the posture identification unit 612 identifies a position vector of the right end of the blade edge 130D in the vehicle body coordinate system by adding the position vector and right bucket vector of the tip (the pin of the tip portion) of the arm 130B in the vehicle body coordinate system.

The posture identification unit 612 can identify the position of each portion in the site coordinate system by translating the position of each portion in the vehicle body coordinate system based on the position of the work machine 100 in the site coordinate system and rotating the position of each portion in the vehicle body coordinate system based on the azimuth direction (yaw angle) of the swing body 120 and the roll angle and pitch angle of the work equipment 130.

<<Display Control Method>>

Figure 6:
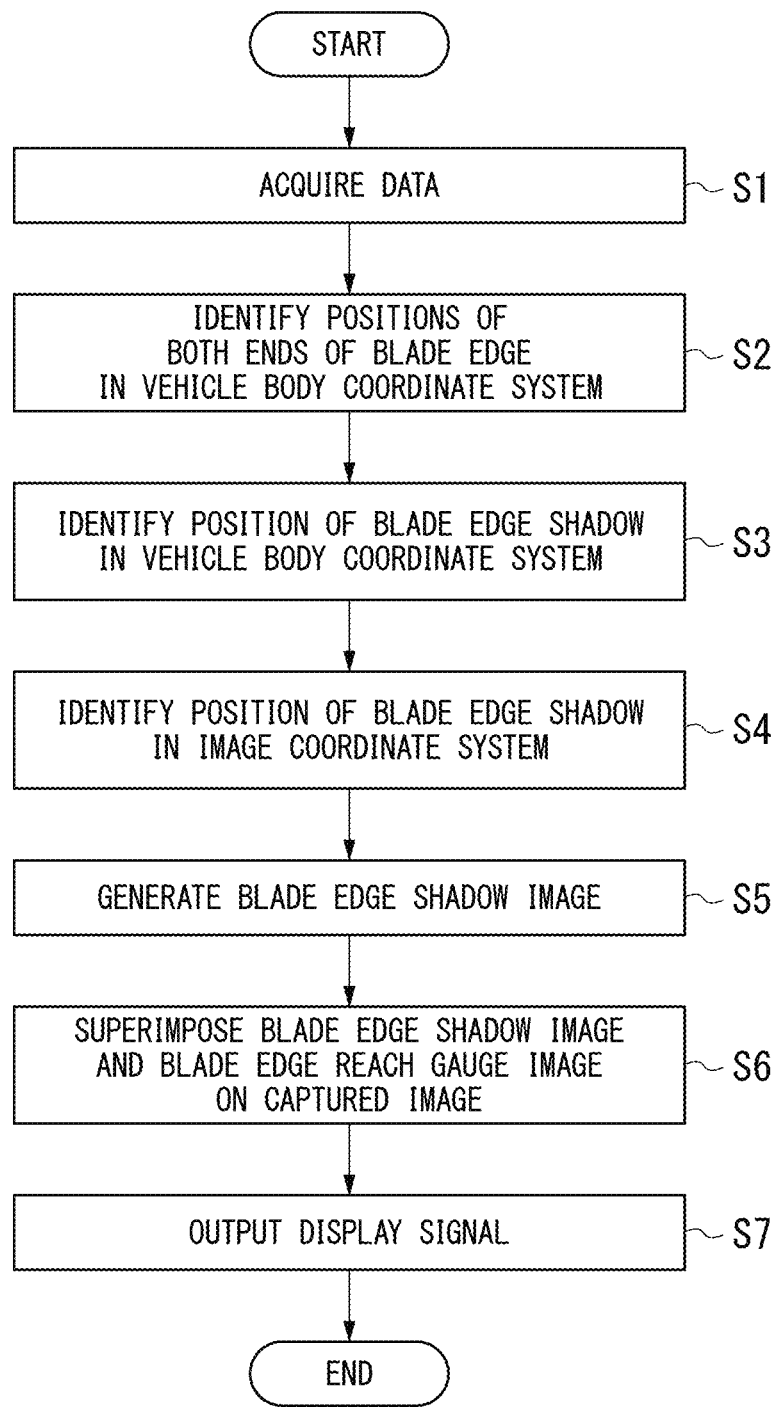
FIG. 6 is a flowchart showing display control processing performed by the remote control device according to the first embodiment.

FIG. 6 is a flowchart showing display control processing performed by the remote control device 540 according to the first embodiment. When the operator starts a remote operation of the work machine 100 with the remote operation room 500, the remote control device 540 performs the display control processing shown in FIG. 6 for each time period.

The data acquisition unit 611 acquires from the vehicle control device 126 of the work machine 100, data indicating an image captured by the camera 122, the swinging speed, position, azimuth direction, and inclination angle of the swing body 120, the posture of the work equipment 130, and the traveling speed of the carriage 110 (Step S1). Next, the posture identification unit 612 identifies positions of both ends of the blade edge 130D in the vehicle body coordinate system based on the data acquired in Step S1 (Step S2).

The blade edge shadow generation unit 613 identifies the position of the blade edge shadow projected on the projection surface in the vehicle body coordinate system by rewriting the values of up-down axis components of the positions of both ends of the blade edge 130D in the vehicle body coordinate system identified in Step S2 to zero (Step S3). The blade edge shadow generation unit 613 converts the position of the blade edge shadow in vehicle body coordinate system into a position in the image coordinate system based on camera parameters (Step S4). The blade edge shadow generation unit 613 generates the blade edge shadow image G1 by drawing a line segment at the converted position (Step S5).

The display image generation unit 614 generates a display image by superimposing the blade edge shadow image G1 generated in Step S5 and the blade edge reach gauge image G2 prepared in advance on the captured image acquired in Step S1 (Step S6). Then, the display control unit 615 outputs a display signal for displaying the display image generated in Step S6 to the display device 520 (Step S7).

Accordingly, the display image shown in FIG. 4 is displayed on the display device 520.

<<Workings and Effects>>

As described above, in the first embodiment, the remote control device 540 displays, on the display device 520, a display image obtained by superimposing a captured image showing the work equipment 130, the blade edge shadow image G1 obtained by projecting the blade edge 130D on a projection surface toward the vertical direction, and the left line G21 and the right line G22 that pass through both ends of the blade edge shadow image G1 and extend in the front-and-rear direction along the projection surface. Accordingly, the operator can easily recognize a range of the work target to be excavated by the work equipment 130. That is, the operator can recognize that a portion of the work target shown in the captured image, which is sandwiched between the left line G21 and the right line G22, will be excavated and can estimate the amount of soil to be excavated. Therefore, the remote control device 540 can prevent a decrease in the work efficiency when work is performed using the work machine 100.

The display image according to the first embodiment includes the reference range graphic G26 representing the reachable range under a condition in which the blade edge 130D is brought into contact with the projection surface F1. Accordingly, the operator can recognize a range having a probability that a piston of the hydraulic cylinder 131 hits the stroke end in a case of moving the blade edge 130D on the projection surface F1. Therefore, the operator can reduce the probability that the piston of the hydraulic cylinder 131 hits the stroke end by operating the operation device 530 while recognizing a positional relationship between the blade edge shadow image G1 and the reference range graphic G26.

The maximum reach line G23 is displayed at a position most separated away from the swinging central axis O of the work machine 100 in the reachable range of the blade edge 130D in the display image according to the first embodiment. Accordingly, the operator can determine whether or not an excavation target ahead of the current position can be excavated by visually recognizing the display image. In another embodiment, the same effect can be achieved even when the left line G21 and the right line G22 extend to the front edge of the reachable range without the maximum reach line G23 displayed. In addition, in another embodiment, the same effect can be achieved even when the left line G21 and the right line G22 extend to infinity in a case where the maximum reach line G23 is displayed.

In addition, the left line G21 and the right line G22 included in the display image according to the first embodiment extend to the position most separated away from the swinging central axis O of the work machine 100 in the reachable range of the blade edge 130D. In addition, the maximum reach line G23 is displayed at the position most separated away from the swinging central axis O of the work machine 100 in the reachable range of the blade edge 130D. Accordingly, the operator can determine whether or not an excavation target ahead of the current position can be excavated by visually recognizing the display image. In another embodiment, the same effect can be achieved even when the left line G21 and the right line G22 extend to the front edge of the reachable range without the maximum reach line G23 displayed. In addition, in another embodiment, the same effect can be achieved even when the left line G21 and the right line G22 extend to infinity in a case where the maximum reach line G23 is displayed.

In addition, the display image according to the first embodiment includes each of the scale lines G24 indicating distances from the swinging central axis O to a plurality of positions separated away from the swinging central axis O and the scale values G25. Accordingly, the operator can recognize the position of the blade edge 130D in a depth direction by visually recognizing the display image. In another embodiment, even when any one of the scale lines G24 and the scale values G25 is not displayed, the same effects can be achieved.

Second Embodiment

Figure 7:
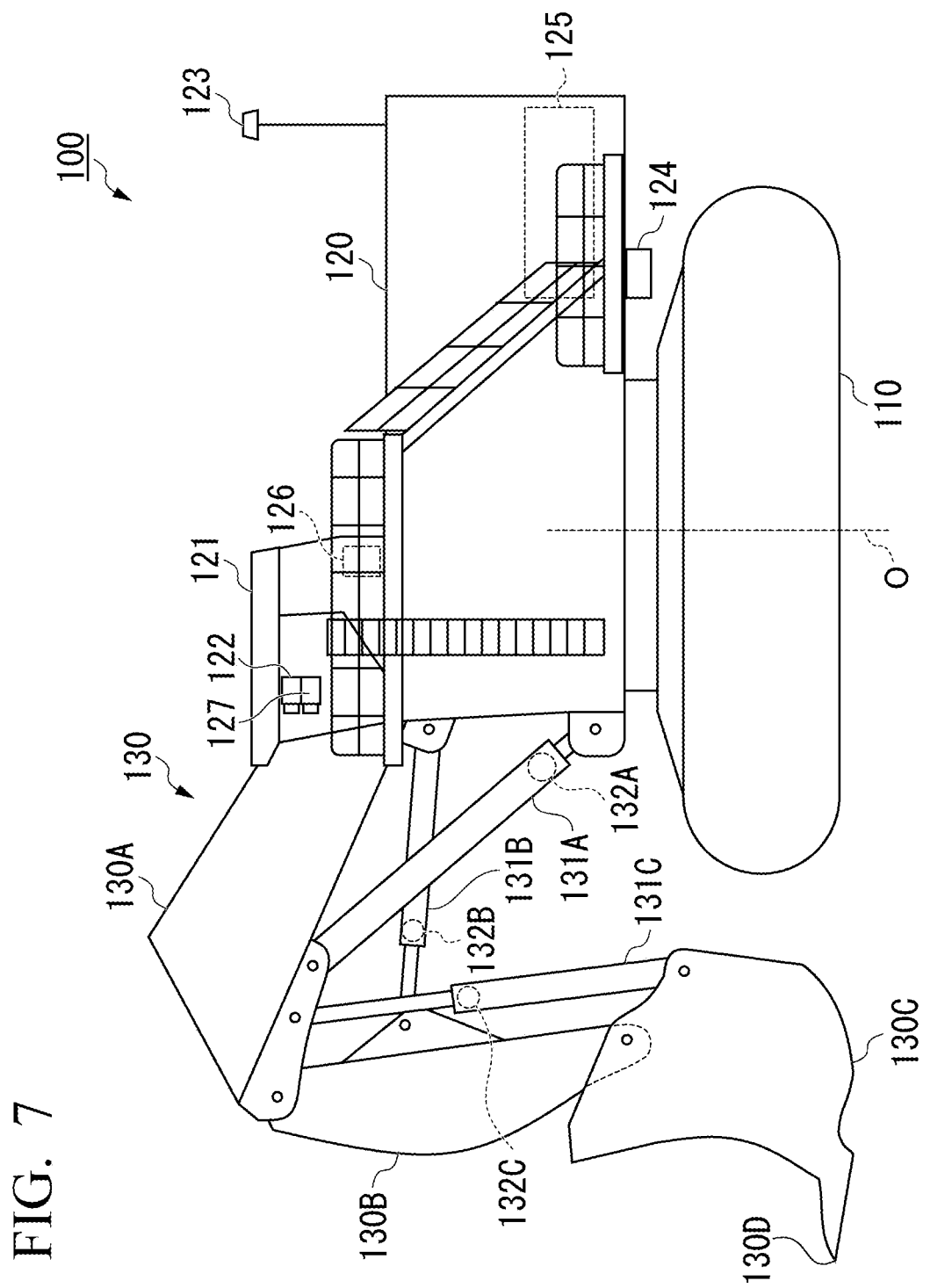
FIG. 7 is an external view of a work machine according to a second embodiment.
Figure 8:
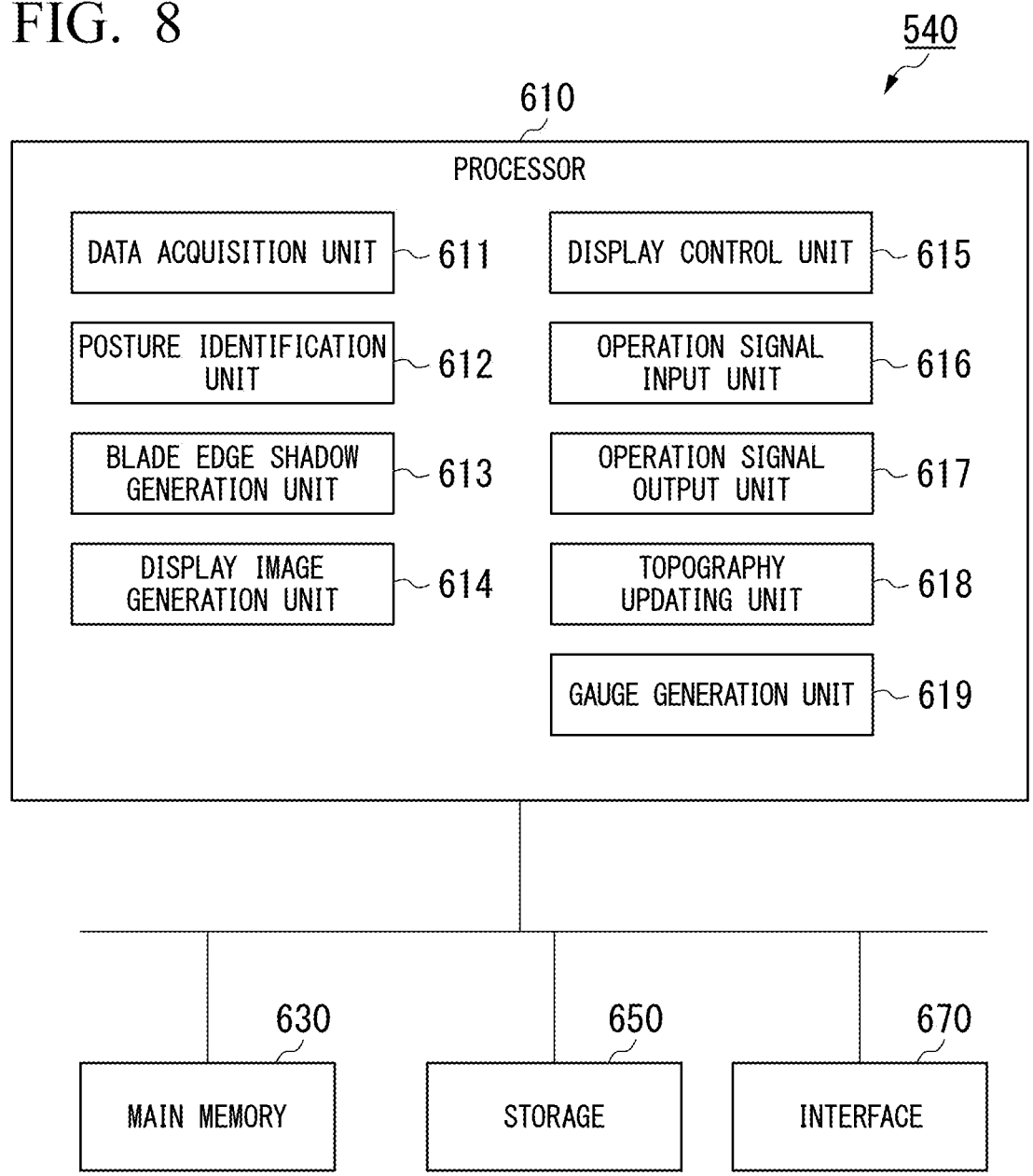
FIG. 8 is a schematic block diagram showing the configuration of a remote control device according to the second embodiment.

The blade edge shadow image G1 and the blade edge reach gauge image G2 according to the first embodiment are images projected on the projection surface F1 which is the plane surface passing through the bottom surface of the carriage 110. On the other hand, the blade edge shadow image G1 and the blade edge reach gauge image G2 according to a second embodiment are projected on the ground surface F2. That is, a projection surface according to the second embodiment is the ground surface F2.
<<Work Machine 100>>
FIG. 7 is an external view of the work machine 100 according to the second embodiment. The work machine 100 according to the second embodiment further includes a depth detection device 127 in addition to the configurations of the first embodiment. The depth detection device 127 is provided in the vicinity of the camera 122 and detects a depth in the same direction as an imaging direction of the camera 122. The term "depth" is a distance from the depth detection device 127 to a target. Exemplary examples of the depth detection device 127 include a LiDAR device, a radar device, and a stereo camera. The detection range of the depth detection device 127 is substantially the same as the imaging range of the camera 122.
<<Remote Control Device 540>>
FIG. 8 is a schematic block diagram showing the configuration of the remote control device 540 according to the second embodiment. The remote control device 540 according to the second embodiment further includes a topography updating unit 618 and a gauge generation unit 619 in addition to the configurations according to the first embodiment. In addition, the remote control device 540 according to the second embodiment is different from that of the first embodiment in terms of processing of the blade edge shadow generation unit 613.

The topography updating unit 618 updates topography data indicating a three-dimensional shape of a work target in the site coordinate system based on depth data acquired from the depth detection device 127 by the data acquisition unit 611. Specifically, the topography updating unit 618 updates the topography data through the following procedures.

The topography updating unit 618 converts the depth data to three-dimensional data related to the vehicle body coordinate system. Since the depth detection device 127 is fixed to the swing body 120, a conversion function between the depth data and the vehicle body coordinate system can be acquired in advance. The topography updating unit 618 removes a portion where the work equipment 130 is shown from the generated three-dimensional data based on the posture of the work equipment 130 in the vehicle body coordinate system identified by the posture identification unit 612. The topography updating unit 618 converts three-dimensional data in the vehicle body coordinate system into three-dimensional data in the site coordinate system based on the position and posture of the vehicle body acquired by the data acquisition unit 611. The topography updating unit 618 updates topography data stored in advance in the main memory 630 using newly generated three-dimensional data. That is, a portion of the topography data stored in advance, which overlaps the newly generated three-dimensional data, is replaced with a value of the new three-dimensional data. Accordingly, the topography updating unit 618 can store the latest topography data in the main memory 630 at all times.

The gauge generation unit 619 generates the blade edge reach gauge image G2 projected on the ground surface F2 based on topography data. For example, the gauge generation unit 619 generates the blade edge reach gauge image G2 through the following procedures. The gauge generation unit 619 converts a portion of the topography data, which is included in the imaging range, into the vehicle body coordinate system based on the position and posture of the vehicle body acquired by the data acquisition unit 611. The gauge generation unit 619 projects the known reach range of the blade edge 130D and a plurality of lines dividing the reach range at regular intervals on the ground surface F2 using the topography data in the vehicle body coordinate system. Accordingly, the gauge generation unit 619 identifies positions of the left line G21, the right line G22, the maximum reach line G23, and the scale lines G24 in the vehicle body coordinate system.

Next, the gauge generation unit 619 identifies a surface where the known reachable range R of the blade edge 130D and the topography data in the vehicle body coordinate system overlap each other as the reference range graphic G26 representing the reachable range under a condition in which the blade edge 130D is brought into contact with the ground surface F2. Next, the gauge generation unit 619 converts the left line G21, the right line G22, the maximum reach line G23, the scale lines G24, and the reference range graphic G26 into an image based on camera parameters of the camera 122. The gauge generation unit 619 attaches the scale values G25 in the vicinity of each of the scale lines G24 of the converted image. Accordingly, the gauge generation unit 619 generates the blade edge reach gauge image G2 projected on the ground surface F2.

Like the gauge generation unit 619, the blade edge shadow generation unit 613 generates the blade edge shadow image G1 obtained by projecting the blade edge 130D on the ground surface F2 based on the topography data.

Figure 9:
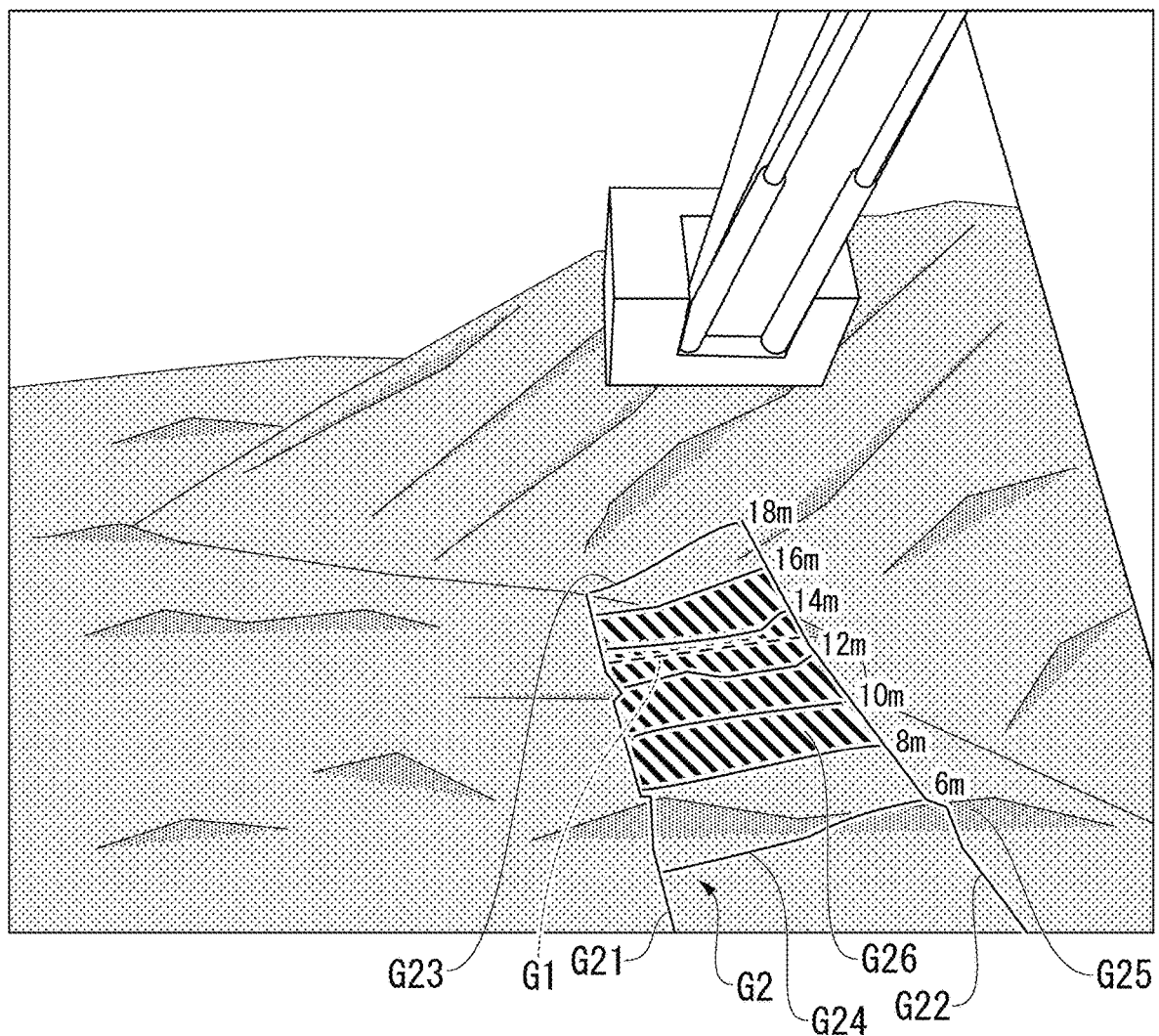
FIG. 9 is a view showing an example of a display image according to the second embodiment.

The display image generation unit 614 generates a display image by superimposing the blade edge shadow image G1 and the blade edge reach gauge image G2 on a captured image acquired by the data acquisition unit 611. FIG. 9 is a view showing an example of the display image according to the second embodiment. The blade edge reach gauge image G2 includes the left line G21, the right line G22, the maximum reach line G23, the scale lines G24, the scale values G25, and the reference range graphic G26.

Figure 10:
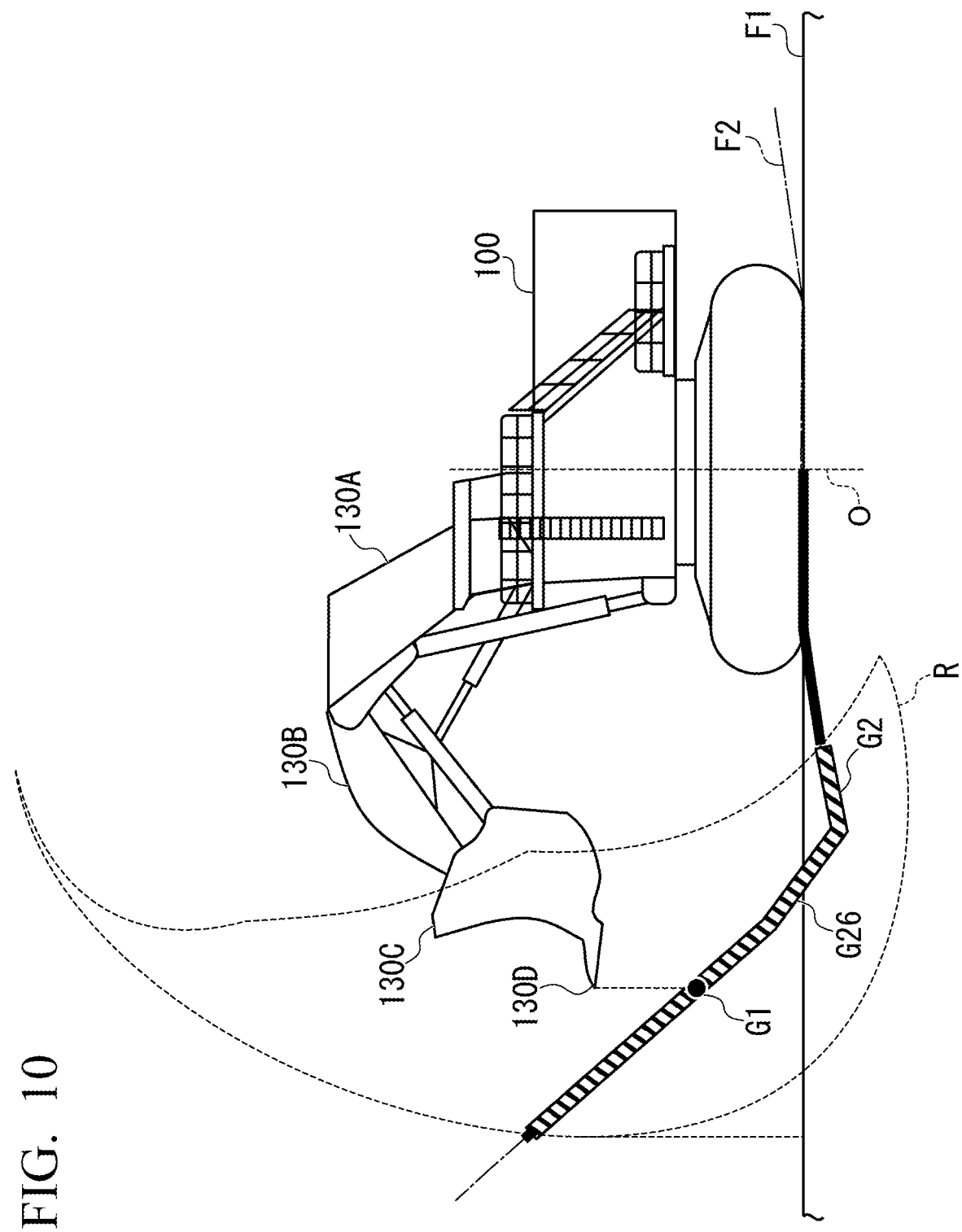
FIG. 10 is a side view showing a relationship between a blade edge shadow image and a blade edge reach gauge image according to the second embodiment.

FIG. 10 is a side view showing a relationship between the blade edge shadow image G1 and the blade edge reach gauge image G2 according to the second embodiment. The blade edge shadow image G1 and the blade edge reach gauge image G2 according to the second embodiment are drawn on the ground surface F2 detected by the depth detection device 127. For this reason, when the blade edge shadow image G1 and the blade edge reach gauge image G2 are superimposed on a captured image, the blade edge shadow image G1 and the blade edge reach gauge image G2 are shown to be stuck on the ground surface F2.

Although the reference range graphic G26 according to the second embodiment represents the reachable range under a condition in which the blade edge 130D is brought into contact with the ground surface F2, the invention is not limited thereto. For example, the reference range graphic G26 according to another embodiment may represent the reachable range under a condition in which the blade edge 130D is brought into contact with the plane surface passing through the bottom surface of the carriage 110, like the first embodiment. In this case, the gauge generation unit 619 generates the reference range graphic G26 by projecting the reachable range on the ground surface F2 under the condition in which the blade edge 130D is brought into contact with the plane surface passing through the bottom surface of the carriage 110.

Third Embodiment

The reference range graphics G26 generated by the remote control device 540 according to the first and second embodiments represent the reachable range under a condition in which the blade edge 130D is brought into contact with the projection surface (the plane surface passing through the bottom surface of the carriage 110 or the ground surface). On the other hand, the remote control device 540 according to a third embodiment represents the reachable range of the blade edge 130D under a condition in which only the arm 130B is driven. This is because an excavation operation of a work target is performed by a pushing operation of the arm 130B in many cases as a mode of use of the loading excavator and a probability that a piston of the arm cylinder 131B hits the stroke end is high compared to the boom cylinder 131A and the bucket cylinder 131C. The configuration of the work system 1 according to the third embodiment is basically the same as in the first embodiment.

<<Remote Control Device 540>>

Figure 11:
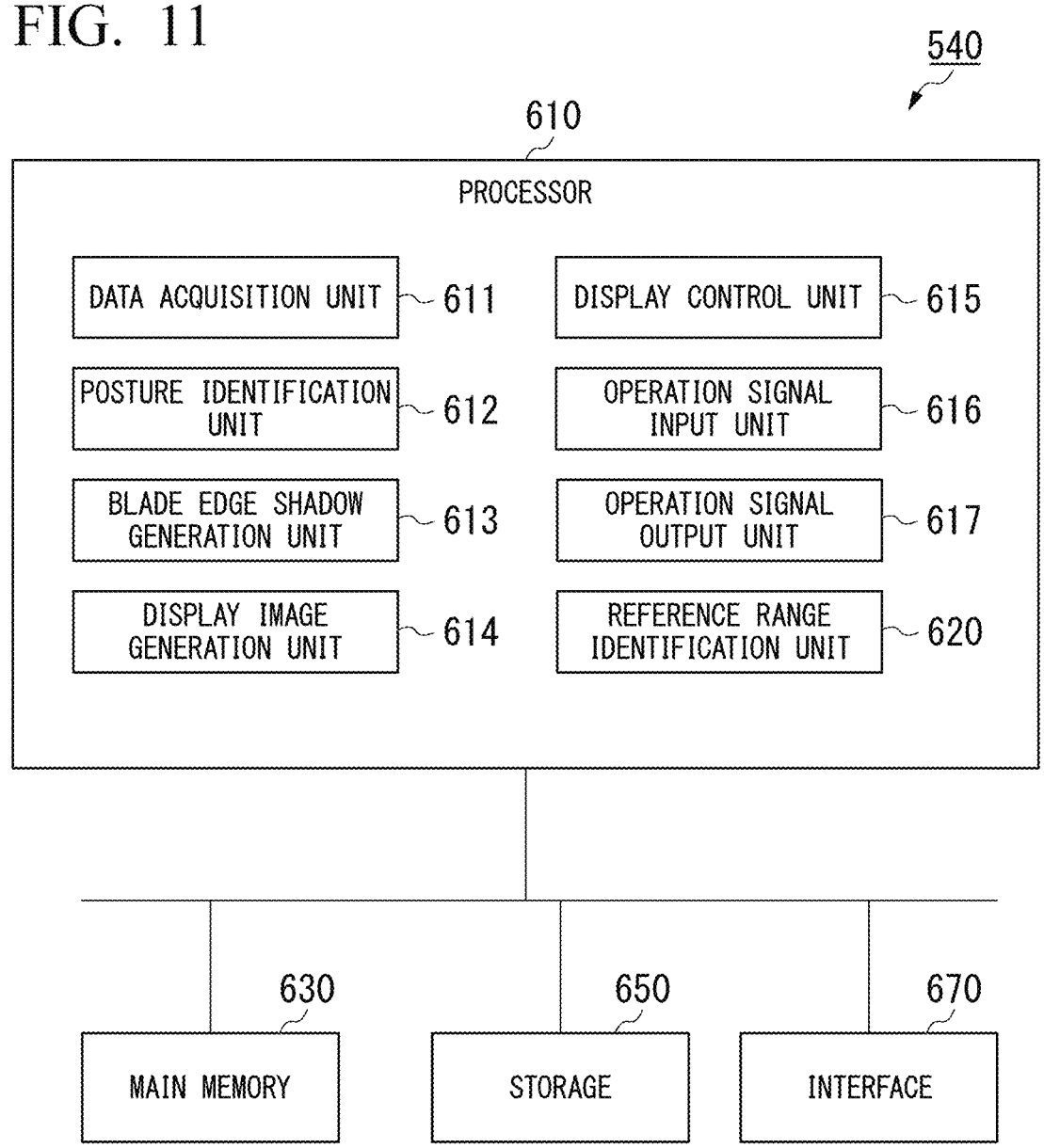
FIG. 11 is a schematic block diagram showing the configuration of a remote control device according to a third embodiment.

FIG. 11 is a schematic block diagram showing the configuration of the remote control device 540 according to the third embodiment. The remote control device 540 according to the third embodiment further includes a reference range identification unit 620 in addition to the configuration according to the first embodiment. The reference range identification unit 620 calculates the reachable range of the blade edge 130D in a case where the boom 130A and the bucket 130C are fixed and only the arm 130B is driven based on the postures of the boom 130A and the bucket 130C identified by the posture identification unit 612.

Figure 12:
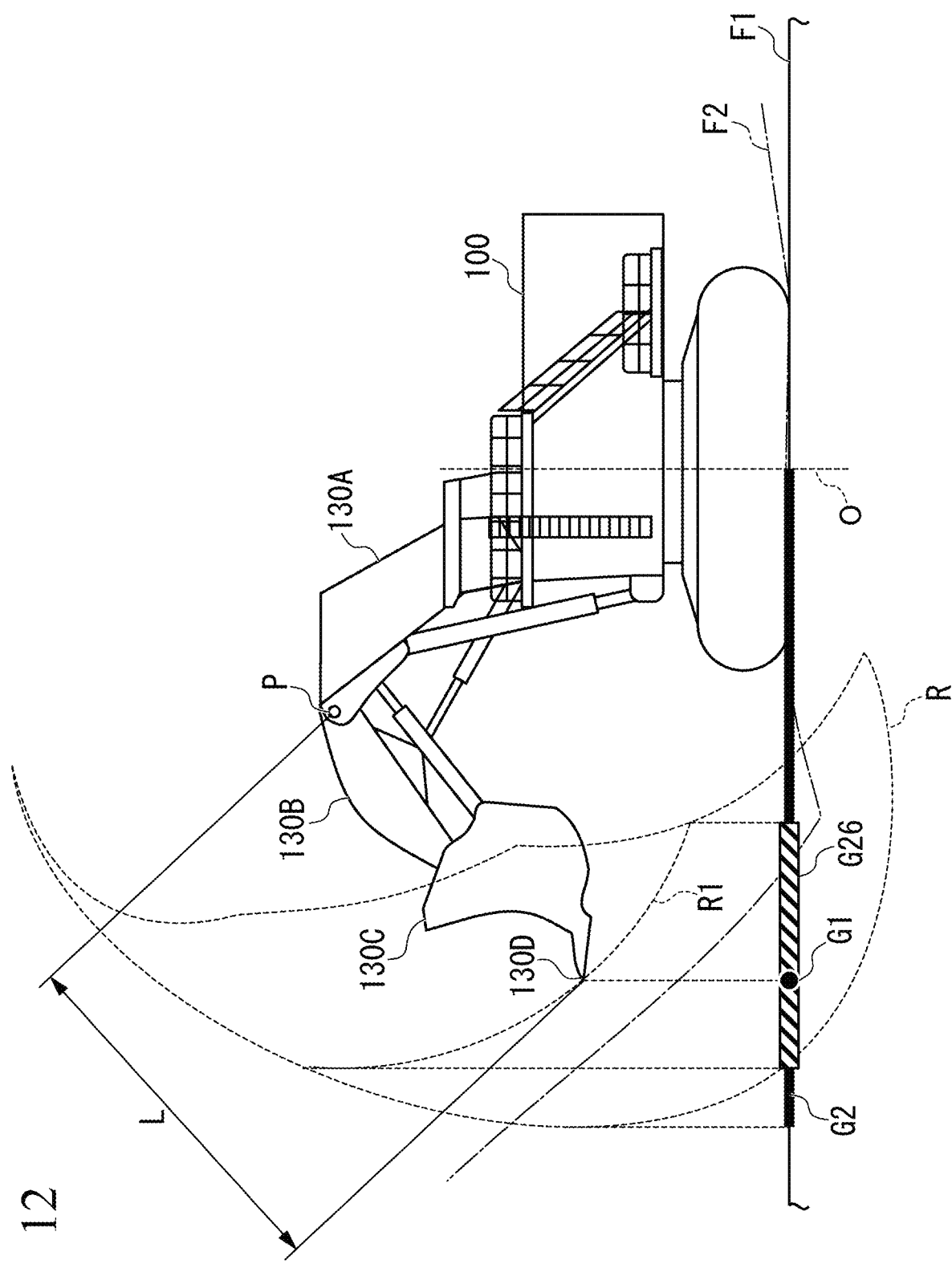
FIG. 12 is a side view showing a relationship between a blade edge shadow image and a blade edge reach gauge image according to the third embodiment.

FIG. 12 is a side view showing a relationship between the blade edge shadow image G1 and the blade edge reach gauge image G2 according to the third embodiment. Specifically, the reference range identification unit 620 identifies a rotation center P (pin center) of the arm 130B based on the posture of the boom 130A and identifies a length L from the rotation center to the blade edge 130D based on the posture of the bucket 130C. Then, the reference range identification unit 620 calculates a reachable range R1 of the blade edge 130D in a case where only the arm 130B is driven based on the known rotation range of the arm 130B. The reference range identification unit 620 generates the reference range graphic G26 by projecting the calculated reachable range R1 on the projection surface F1 from the vertical direction. The reference range graphic G26 generated by the reference range identification unit 620 changes each time the posture of at least one of the boom 130A and the bucket 130C changes.

Accordingly, the operator can remotely operate the work machine 100 such that the piston of the arm cylinder 131B does not hit the stroke end by controlling the work equipment 130 such that the blade edge shadow image G1 does not hit an end of the reference range graphic G26.

Modification Example

Although the blade edge reach gauge image G2 according to the third embodiment has a shape projected on the projection surface F1, the invention is not limited thereto. For example, the blade edge reach gauge image G2 according to another embodiment may have a shape projected on the ground surface F2 as in the second embodiment.

Another Embodiment

Although one embodiment has been described in detail with reference to the drawings hereinbefore, a specific configuration is not limited to the description above, and various design changes are possible. That is, in another embodiment, order of processing described above may be changed as appropriate. In addition, some of the processing may be performed in parallel.

The remote control device 540 according to the embodiments described above may be configured by a computer alone, or the remote control device 540 may function as the configuration of the remote control device 540 is divided by a plurality of computers and is disposed, and the plurality of computers cooperate with each other. At this time, some of the computers configuring the remote control device 540 may be provided in the remote operation room 500, and the other computers may be provided outside the remote operation room 500. For example, the work machine 100 may be provided with some of the computers configuring the remote control device 540.

Figure 13:
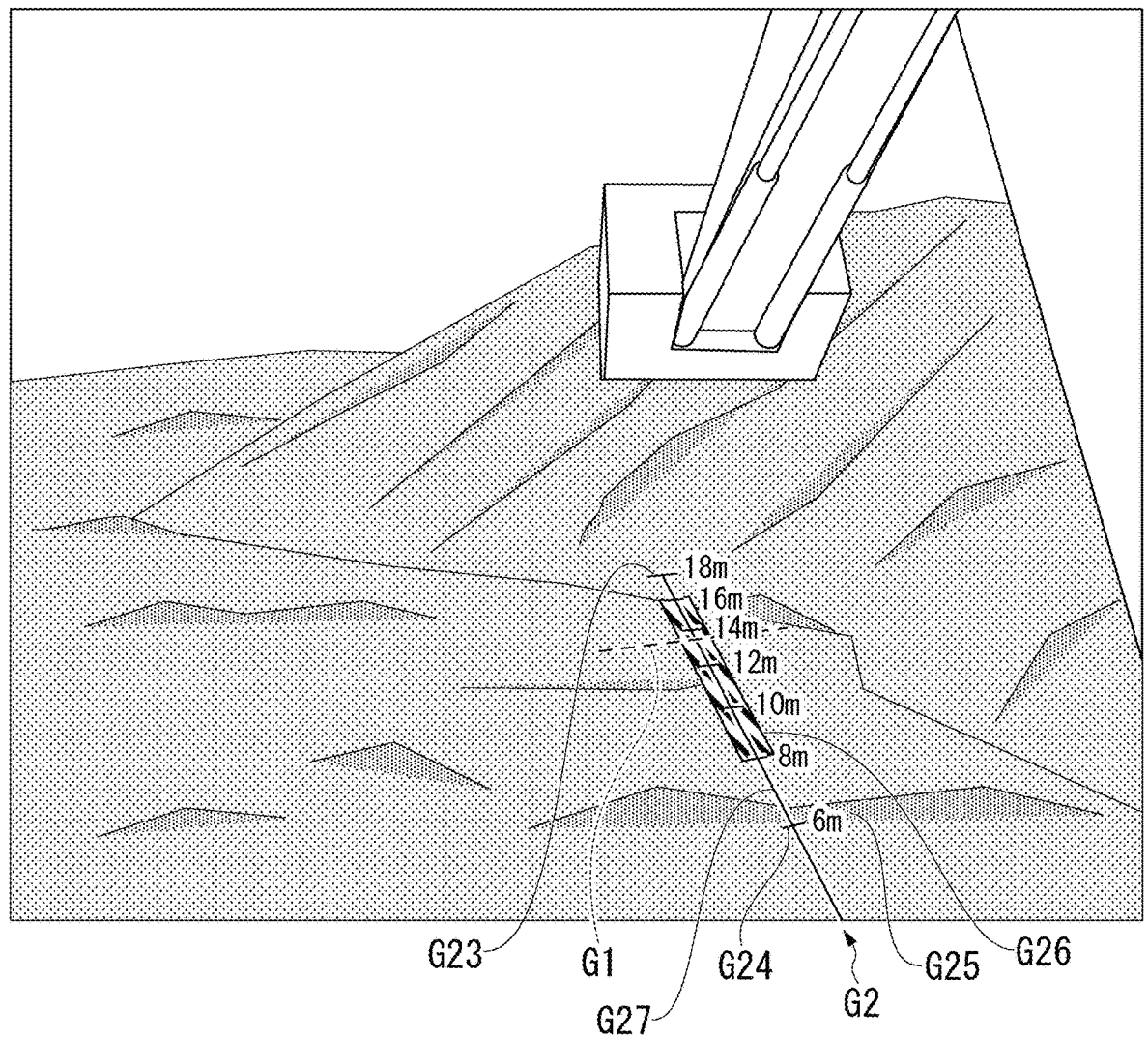
FIG. 13 is a view showing an example of a display image according to another embodiment.

FIG. 13 is a view showing an example of a display image according to another embodiment. The operator can recognize a range excavated by the work equipment 130 with the blade edge reach gauge image G2 according to the embodiments described above as the left line G21 and the right line G22 are included. On the other hand, as shown in FIG. 13, the blade edge reach gauge image G2 according to another embodiment may include a center line G27 instead of the left line G21 and the right line G22 in the display image. The center line G27 passes through a center point of the blade edge 130D and extends in the front-and-rear direction along the projection surface. Also in this case, the operator can recognize the position of the blade edge 130D in the depth direction with at least one of an end point of the center line G27, the maximum reach line G23, the scale lines G24, the scale values G25, and the reference range graphic G26.

Although the reference range graphic G26 according to the embodiments described above shows the front edge and rear edge of the reachable range of the blade edge 130D under a predetermined condition, another embodiment is not limited thereto. For example, in a case where the work machine 100 is a loading excavator, excavation work is usually performed by a push operation of the arm 130B since the blade edge 130D of the bucket 130C faces the front. For this reason, the front edge has a high probability of hitting the stroke end compared to the rear edge of the reachable range. Therefore, the reference range graphic G26 according to another embodiment may represent only the front edge of the reachable range of the blade edge 130D under a predetermined condition. On the other hand, in a case where the work machine 100 is a backhoe, excavation work is usually performed by a pulling operation of the arm 130B since the blade edge 130D of the bucket 130C faces the rear. For this reason, the rear edge has a high probability of hitting the stroke end compared to the front edge of the reachable range. Therefore, the reference range graphic G26 according to another embodiment may represent only the rear edge of the reachable range of the blade edge 130D under a predetermined condition.

INDUSTRIAL APPLICABILITY

According to the above aspect, a decrease in the work efficiency when work is performed using the work machine can be prevented.

REFERENCE SIGNS LIST

1: Work system
100: Work machine
110: Carriage
120: Swing body
121: Cab
122: Camera
130: Work equipment
130A: Boom
130B: Arm
130C: Bucket
130D: Blade edge
500: Remote operation room
510: Driver's seat
520: Display device
530: Operation device
540: Remote control device
611: Data acquisition unit
612: Posture identification unit
613: Blade edge shadow generation unit
614: Display image generation unit
615: Display control unit
616: Operation signal input unit
617: Operation signal output unit
618: Topography updating unit
619: Gauge generation unit
620: Reference range identification unit
G1: Blade edge shadow image
G2: Blade edge reach gauge image
G21: Left line
G22: Right line
G23: Maximum reach line
G24: Scale line
G25: Scale value
G26: Reference range graphic

What is claimed is:

1. A display control device comprising:
a processor configured to:
acquire a captured image from a camera provided at a work machine, the captured image showing work equipment of the work machine;
generate a blade edge shadow obtained by projecting a blade edge of the work equipment on a projection surface toward a vertical direction;
generate a display image obtained by superimposing (i) the captured image, (ii) the blade edge shadow, (iii) a left line that passes through a left end of the blade edge shadow and extends in a front-and-rear direction of the work equipment along the projection surface, and (iv) a right line that passes through a right end of the blade edge shadow and extends in the front-and-rear direction of the work equipment along the projection surface; and
output a display signal for displaying the display image on a display device.

2. The display control device according to claim 1, wherein the left line and the right line extend forward and backward with respect to the blade edge shadow.

3. The display control device according to claim 1, wherein the left line and the right line extend to a position obtained by projecting a position most separated away from a reference position of the work machine in a reachable range of the blade edge on the projection surface.

4. The display control device according to claim 1, wherein the display image includes a maximum reach line parallel to the blade edge shadow obtained by projecting a position most separated away from a reference position of the work machine in a reachable range of the blade edge on the projection surface.

5. The display control device according to claim 1, wherein the display image includes a distance image indicating a distance from a reference position of the work machine to each of a plurality of positions separated away from the reference position in a vicinity of the left line or the right line.

6. The display control device according to claim 5, wherein the distance image includes a plurality of lines parallel to the blade edge shadow and separated by each unit distance from the reference position.

7. The display control device according to claim 5, wherein the distance image includes a numerical value indicating a distance from the reference position.

8. The display control device according to claim 1, wherein the projection surface is a plane surface passing through a ground contact surface of the work machine.

9. A display method comprising:

acquiring a captured image from a camera provided at a work machine, the captured image showing work equipment of the work machine;

generating a blade edge shadow obtained by projecting a blade edge of the work equipment on a projection surface toward a vertical direction;

generating a display image obtained by superimposing (i) the captured image, (ii) the blade edge shadow, (iii) a left line that passes through a left end of the blade edge shadow and extends in a front-and-rear direction of the work equipment along the projection surface, and (iv) a right line that passes through a right end of the blade edge shadow and extends in the front-and-rear direction of the work equipment along the projection surface; and displaying the display image on a display device.

\* \* \* \* \*